(12) United States Patent
Gupta et al.

(10) Patent No.: US 10,836,447 B2
(45) Date of Patent: Nov. 17, 2020

(54) HYDRAULIC WALKING MUD/SHAKER TANK SYSTEM

(71) Applicant: NABORS CORPORATE SERVICES, INC., Houston, TX (US)

(72) Inventors: Ashish Gupta, Houston, TX (US); Ralph Shamas, Jr., Humble, TX (US)

(73) Assignee: NABORS CORPORATE SERVICES, INC., Houston, TX (US)

( * ) Notice: Subject to any disclaimer, the term of this patent is extended or adjusted under 35 U.S.C. 154(b) by 0 days.

(21) Appl. No.: 16/596,155

(22) Filed: Oct. 8, 2019

(65) Prior Publication Data

US 2020/0031411 A1 Jan. 30, 2020

Related U.S. Application Data

(63) Continuation of application No. 15/292,429, filed on Oct. 13, 2016, now Pat. No. 10,472,009.

(60) Provisional application No. 62/241,550, filed on Oct. 14, 2015.

(51) Int. Cl.
*E21B 21/06* (2006.01)
*B62D 39/00* (2006.01)
*B62D 57/032* (2006.01)
*B65D 88/12* (2006.01)

(52) U.S. Cl.
CPC .......... *B62D 57/032* (2013.01); *B62D 39/00* (2013.01); *B65D 88/128* (2013.01); *E21B 21/065* (2013.01); *E21B 21/067* (2013.01)

(58) Field of Classification Search
CPC .... E21B 21/065; E21B 21/067; E21B 21/066; B62D 39/00; B62D 57/032; B62D 88/128
See application file for complete search history.

(56) References Cited

U.S. PATENT DOCUMENTS

| | | | | |
|---|---|---|---|---|
| 4,413,511 A * | 11/1983 | Godbey | ............... | E21B 21/065 175/48 |
| 5,921,336 A * | 7/1999 | Reed | ..................... | E21B 15/003 180/8.1 |
| 8,561,733 B2 * | 10/2013 | Smith | ................... | E21B 15/003 180/8.1 |
| 9,045,178 B2 * | 6/2015 | Smith | ................... | E21B 15/003 |
| 9,132,871 B2 * | 9/2015 | Crisp | ..................... | B62D 57/02 |
| 9,518,429 B2 * | 12/2016 | Fortson | ............... | B62D 57/022 |
| 10,472,009 B2 * | 11/2019 | Gupta | .................. | B62D 57/032 |
| 2002/0185319 A1 * | 12/2002 | Smith | ................... | E21B 15/003 180/9 |
| 2014/0271094 A1 * | 9/2014 | Crisp | ..................... | B62D 57/02 414/800 |
| 2015/0114717 A1 * | 4/2015 | Fortson | ................ | E21B 15/003 175/57 |

(Continued)

*Primary Examiner* — Daniel P Stephenson
(74) *Attorney, Agent, or Firm* — Adolph Locklar

(57) ABSTRACT

A walking mud handling system may include a walking mud tank and a plurality of hydraulic walkers coupled to the walking mud tank. Each hydraulic walker may include a walking foot, a hydraulic lift, and a sliding actuator. The hydraulic lift may include a hydraulic cylinder coupled to the walking foot such that extension of the hydraulic cylinder extends the walking foot into contact with the ground. The sliding actuator may include one or more hydraulic cylinders coupled to the walking foot such that extension of the sliding actuator moves the walking foot laterally relative to the hydraulic lift.

15 Claims, 11 Drawing Sheets

(56) References Cited

U.S. PATENT DOCUMENTS

| | | | |
|---|---|---|---|
| 2015/0166134 A1* | 6/2015 | Trevithick | B62D 57/02 |
| | | | 180/8.1 |
| 2017/0081924 A1* | 3/2017 | Smith | E21B 15/003 |
| 2017/0101826 A1* | 4/2017 | Sigmar | E21B 19/14 |
| 2017/0106925 A1* | 4/2017 | Gupta | E21B 21/01 |
| 2018/0163483 A1* | 6/2018 | Ferland | E21B 15/003 |
| 2018/0202237 A1* | 7/2018 | Gupta | E21B 33/06 |
| 2020/0031411 A1* | 1/2020 | Gupta | B65D 88/128 |

* cited by examiner

US 10,836,447 B2

HYDRAULIC WALKING MUD/SHAKER TANK SYSTEM

CROSS-REFERENCE TO RELATED APPLICATIONS

This application is a continuation of and claims priority to U.S. nonprovisional application Ser. No. 15/292,429, filed Oct. 13, 2016, which itself claims priority from U.S. provisional application No. 62/241,550, filed Oct. 14, 2015, each of which is incorporated by reference herein in its entirety.

TECHNICAL FIELD/FIELD OF THE DISCLOSURE

The present disclosure relates generally to oilfield equipment, and specifically to drilling fluid handling equipment.

BACKGROUND OF THE DISCLOSURE

In an oil field, numerous wells may be drilled by a single drilling rig. The drilling rig may be able to be moved from one well to the next by skidding or walking. Connections between the drilling rig and other rig equipment, including, for example, pipe handling equipment, electricity supplies, and drilling fluid handling equipment may limit the movement of the drilling rig. Drilling fluid handling equipment, referred to herein as mud handling equipment, may include shaker tables, degassers, trip tanks, etc. Because of losses in pumping the drilling fluid from the mud handling equipment, the distance between the mud handling equipment and the drilling rig, coupled by a flow line, is typically kept as short as possible. Therefore, the mud handling equipment is typically located near the drilling rig and therefore needs to be dragged or moved as the drilling rig is moved. Such an operation may require additional equipment such as a crane or pull truck.

SUMMARY

The present disclosure provides for a walking mud handling system. The walking mud handling system may include a walking mud tank and a plurality of hydraulic walkers coupled to the walking mud tank. The hydraulic walkers may include a walking foot, a hydraulic lift, and a sliding actuator. The hydraulic lift may include a hydraulic cylinder coupled to the walking foot such that extension of the hydraulic cylinder extends the walking foot into contact with the ground. The sliding actuator may include one or more hydraulic cylinders coupled to the walking foot such that extension of the sliding actuator moves the walking foot laterally relative to the hydraulic lift.

The present disclosure also provides for a method. The method may include providing a walking mud handling system. The walking mud handling system may include a walking mud tank and a plurality of hydraulic walkers coupled to the walking mud tank. The hydraulic walkers may include a walking foot, a hydraulic lift, and a sliding actuator. The hydraulic lift may include a hydraulic cylinder coupled to the walking foot such that extension of the hydraulic cylinder extends the walking foot into contact with the ground. The sliding actuator may include one or more hydraulic cylinders coupled to the walking foot such that extension of the sliding actuator moves the walking foot laterally relative to the hydraulic lift. The method may further include positioning the walking mud handling system at a first position in a wellsite. The method may further include extending the hydraulic lifts of the hydraulic walkers. The method may further include lifting the walking mud tank off the ground. The method may further include actuating the sliding actuators to move the walking feet from a first position to a second position. The method may further include moving the walking mud handling system in a first direction. The method may further include retracting the hydraulic lifts. The method may further include placing the walking mud tank on the ground. The method may further include actuating the sliding actuators to return the walking feet to the first position.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
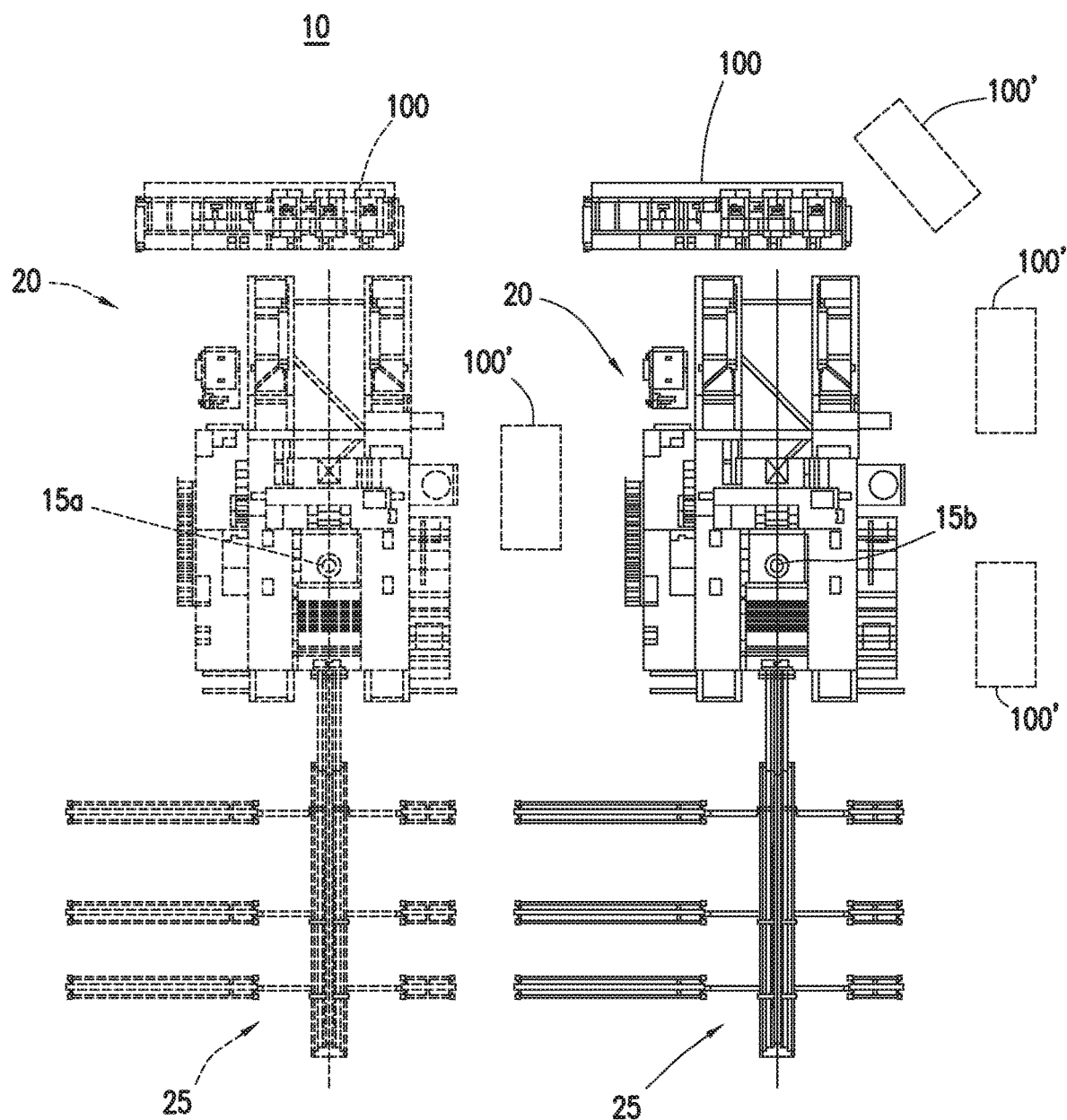
FIG. 1 depicts an overhead view of a wellsite having a walking mud handling system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts wellsite 10. Wellsite 10 may include one or more wells, shown in FIG. 1 as having two wells 15a, 15b. Drilling rig 20 may be used to drill a first well, for example well 15a. Drilling rig 20 may then relocate by, for example and without limitation, walking or skidding, to well 15b. As used herein, "skidding" refers to sliding the rig across ground from one well to another. As used herein, "walking" refers to use of a walking system to move the rig from one well to another.

Walking mud handling system 100 may include hydraulic walkers as discussed further herein below that may allow walking mud handling system 100 to move from one position in wellsite 10 to another position in wellsite 10, such as by walking. For example and without limitation, walking mud handling system 100 may move from a position next to drilling rig 20 at well 15a to a position next to drilling rig 20 at well 15b. Walking mud handling system 100 may be positionable without the use of cranes or pull trucks to move walking mud handling system 100. Walking mud handling system 100 may be positioned on any side of drilling rig 20 not occupied by other equipment, such as pipe handling equipment 25, such as, for example and without limitation, the positions shown in wellsite 10 of walking mud handling systems 100'. Wellsite 10 as shown in FIG. 1 may include additional equipment omitted from FIG. 1 for the sake of clarity.

Figure 2:
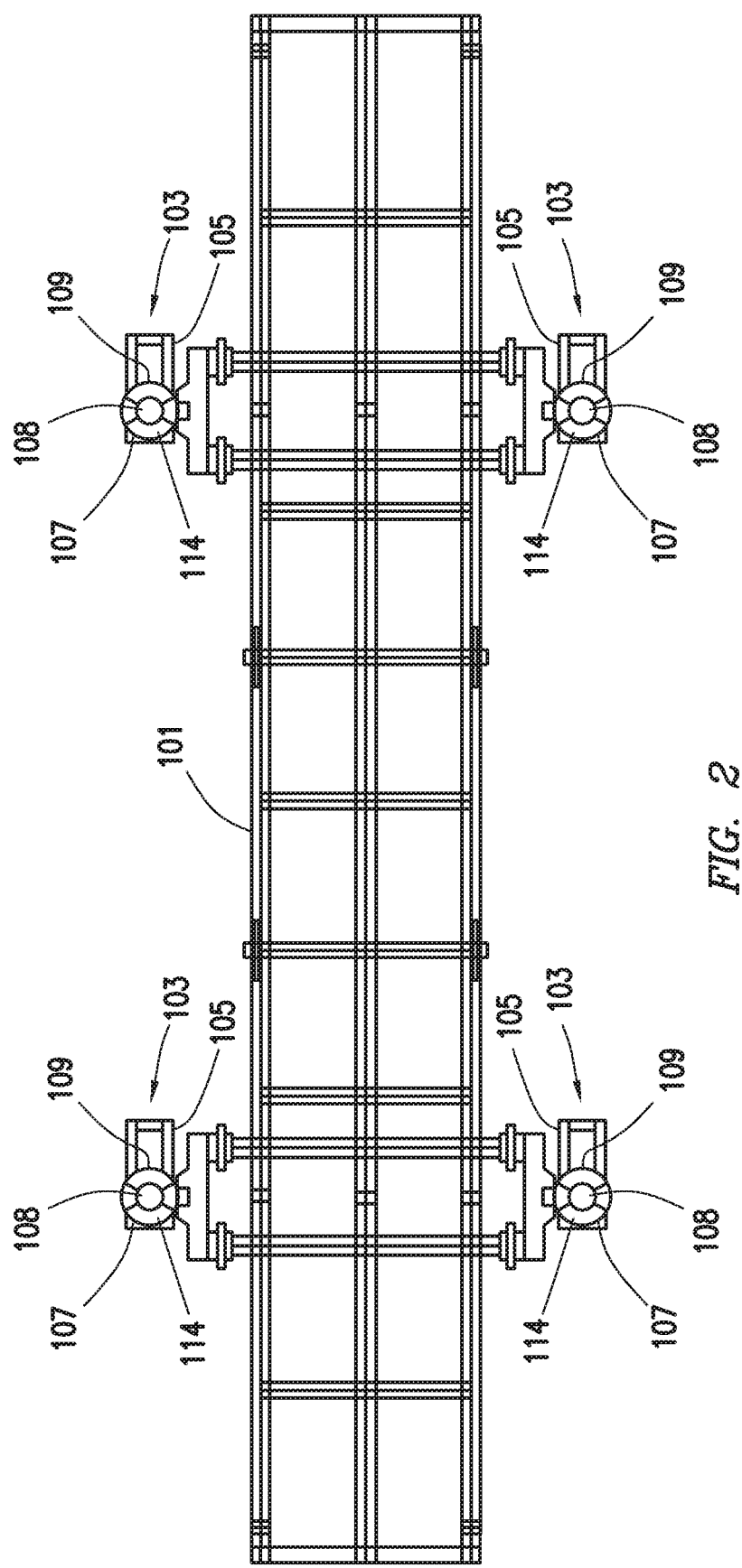
FIG. 2 is an overhead schematic view of a walking mud handling system consistent with at least one embodiment of the present disclosure.
Figure 3:
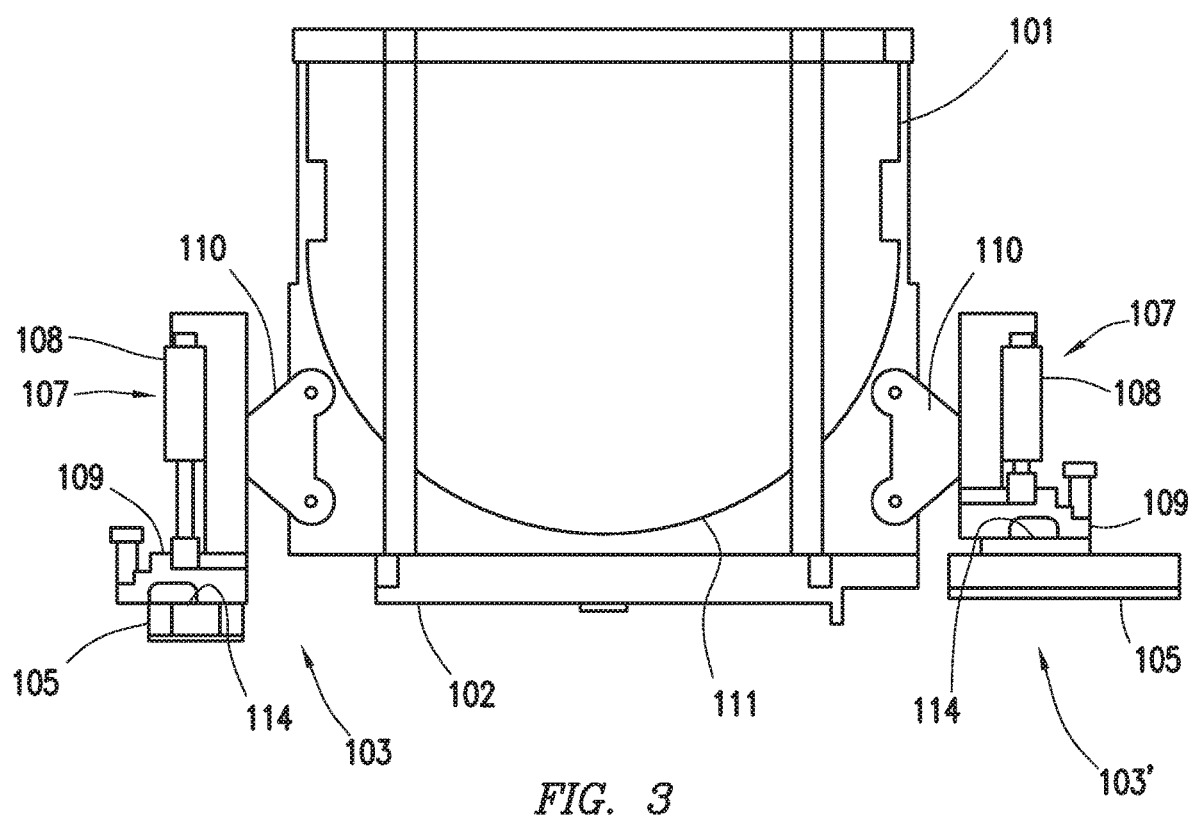
FIG. 3 is an end schematic view of a walking mud handling system consistent with at least one embodiment of the present disclosure.

As depicted in FIGS. 2-4, walking mud handling system 100 may include walking mud tank 101. In some embodiments, walking mud tank 101 may include skid 102. Skid 102 may be a support structure or frame for other components of walking mud handling system 100. Walking mud handling system 100 may include hydraulic walkers 103 coupled to walking mud tank 101. Hydraulic walkers 103 may be used to reposition walking mud handling system 100 between different locations in wellsite 10. In some embodiments, walking mud handling system 100 may be moved by a walking operation as described herein below. In some embodiments, the walking operation may be carried out when one or more tanks of walking mud handling system 100 are empty, partially full, or full.

Figure 4A:
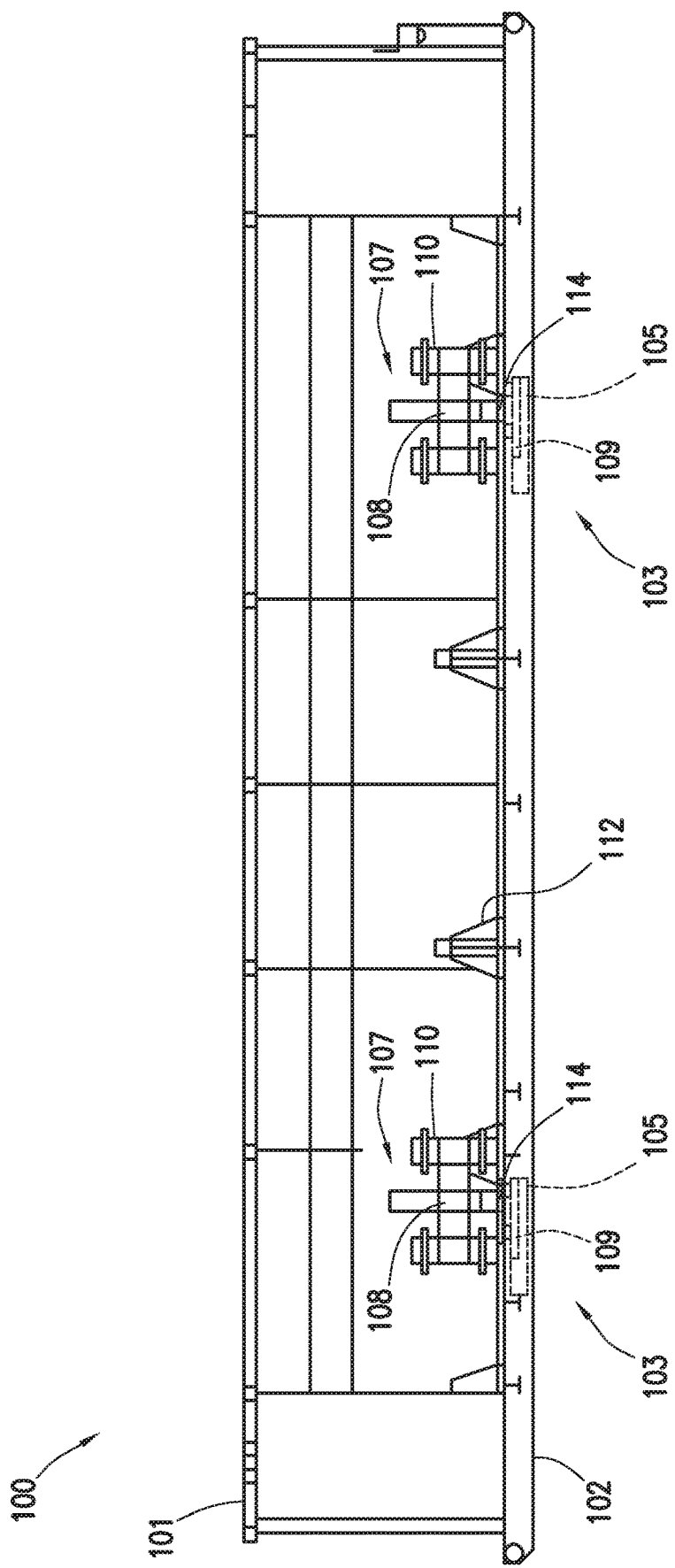
FIGS. 4A-4D are side schematic views of a walking mud handling system consistent with at least one embodiment of the present disclosure.
Figure 4B:
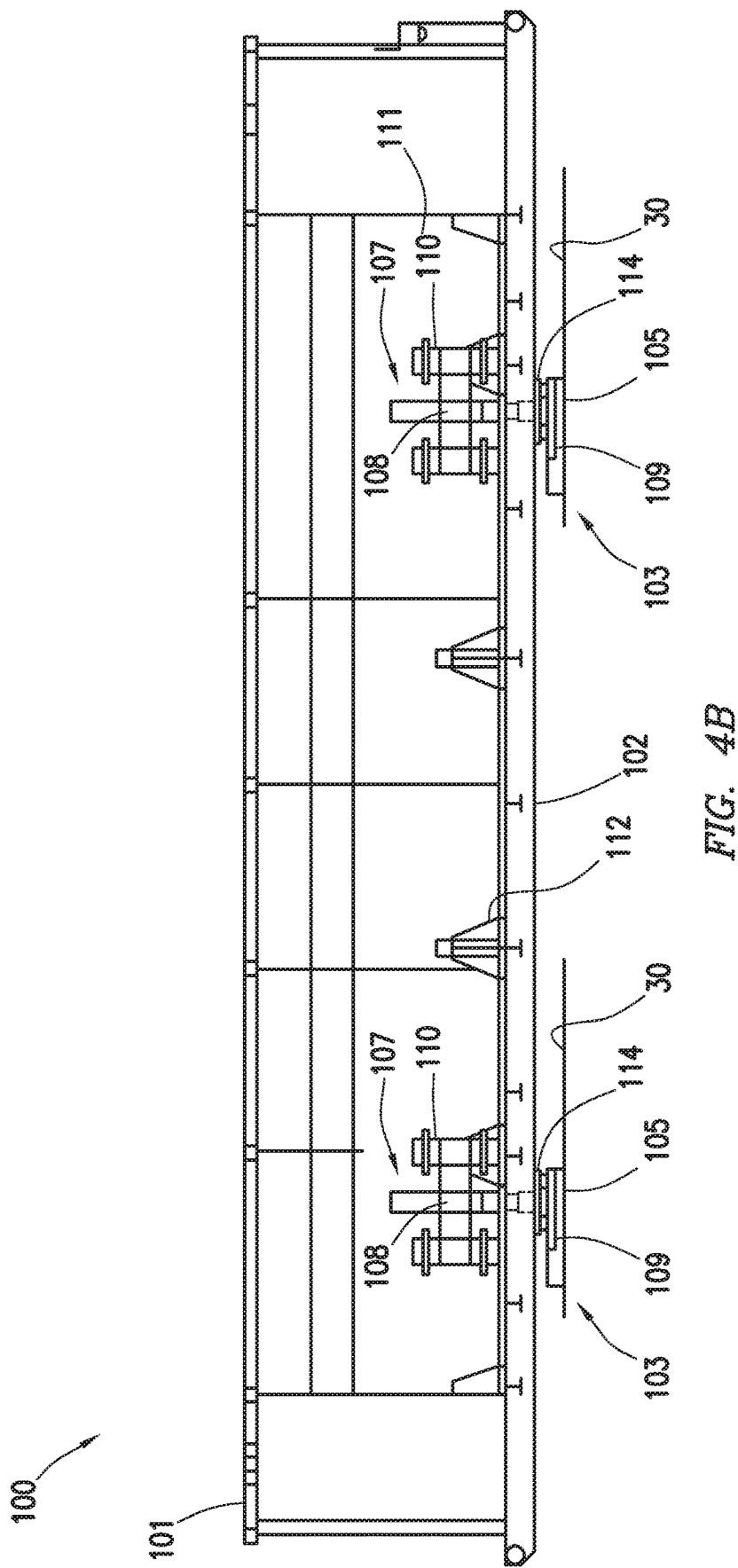

Hydraulic walkers 103 may include walking foot 105 and hydraulic lift assembly 107 as depicted in FIG. 4A. Walking foot 105 may be a pad or any other structure configured to support the weight of walking mud tank 101 and associated equipment during a walking operation as discussed herein below. Hydraulic lift assembly 107 may include one or more hydraulic cylinders 108 positioned to move hydraulic walker 103 between a retracted position, as depicted in FIG. 4A, and an extended position, as depicted in FIG. 4B. Hydraulic lift assembly 107 may be mechanically coupled to walking mud tank 101 by mounting structure 110. Mounting structure 110 may include any mechanical fasteners, plates, or other adapters to couple between hydraulic lift assembly 107 and walking mud tank 101. In some embodiments, mounting structure 110 may be an outrigger structure. In a walking operation, depicted in FIGS. 4A-4D, hydraulic walkers 103 may be positionable in a retracted position as shown in FIG. 4A. In the retracted position, walking mud tank 101 may be in contact with the ground 30, allowing the weight of walking mud handling system 100 to be supported by walking mud tank 101. When hydraulic walker 103 is in the extended position, as depicted in FIG. 4B, walking foot 105 may support walking mud tank 101 above the ground 30.

Figure 4C:
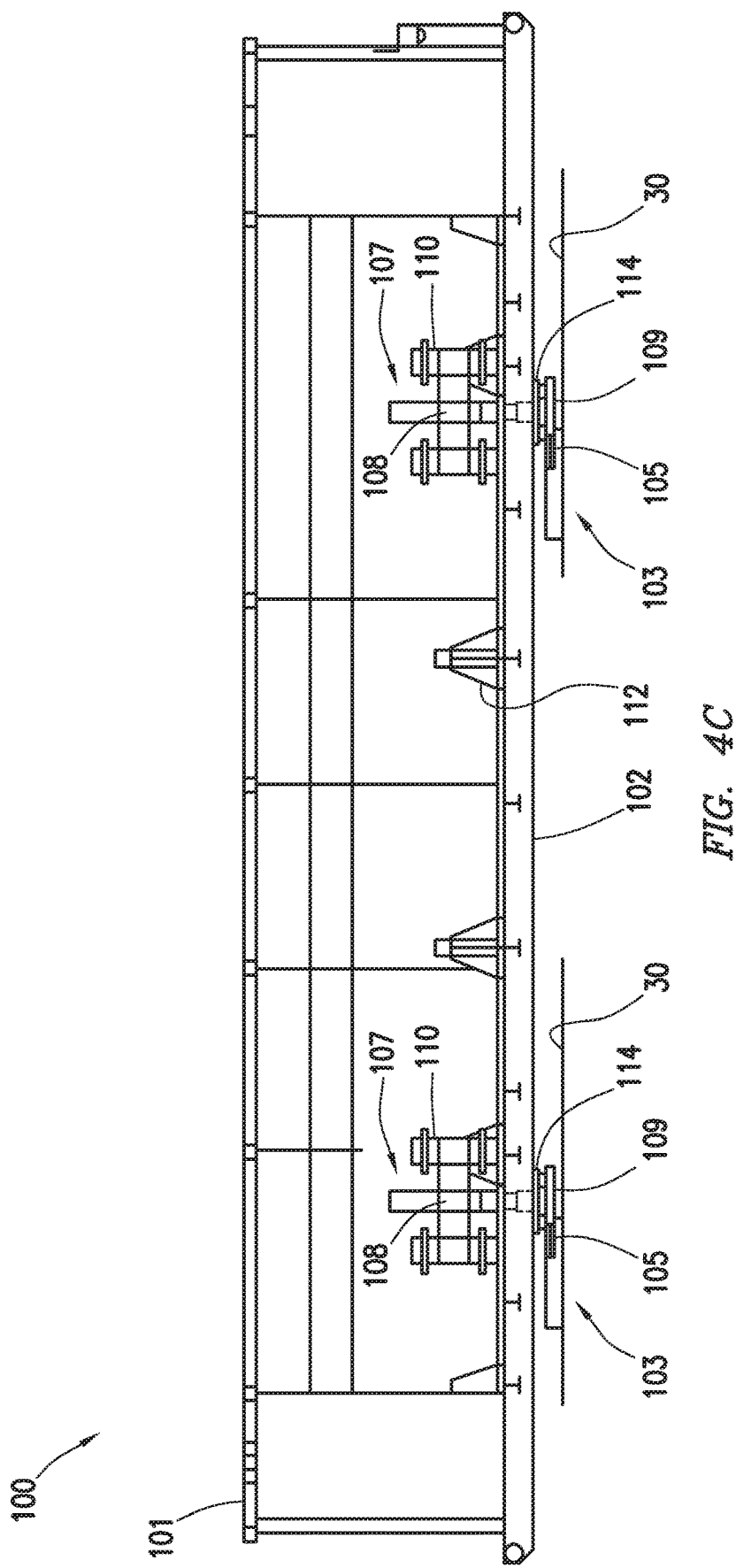
Figure 4D:
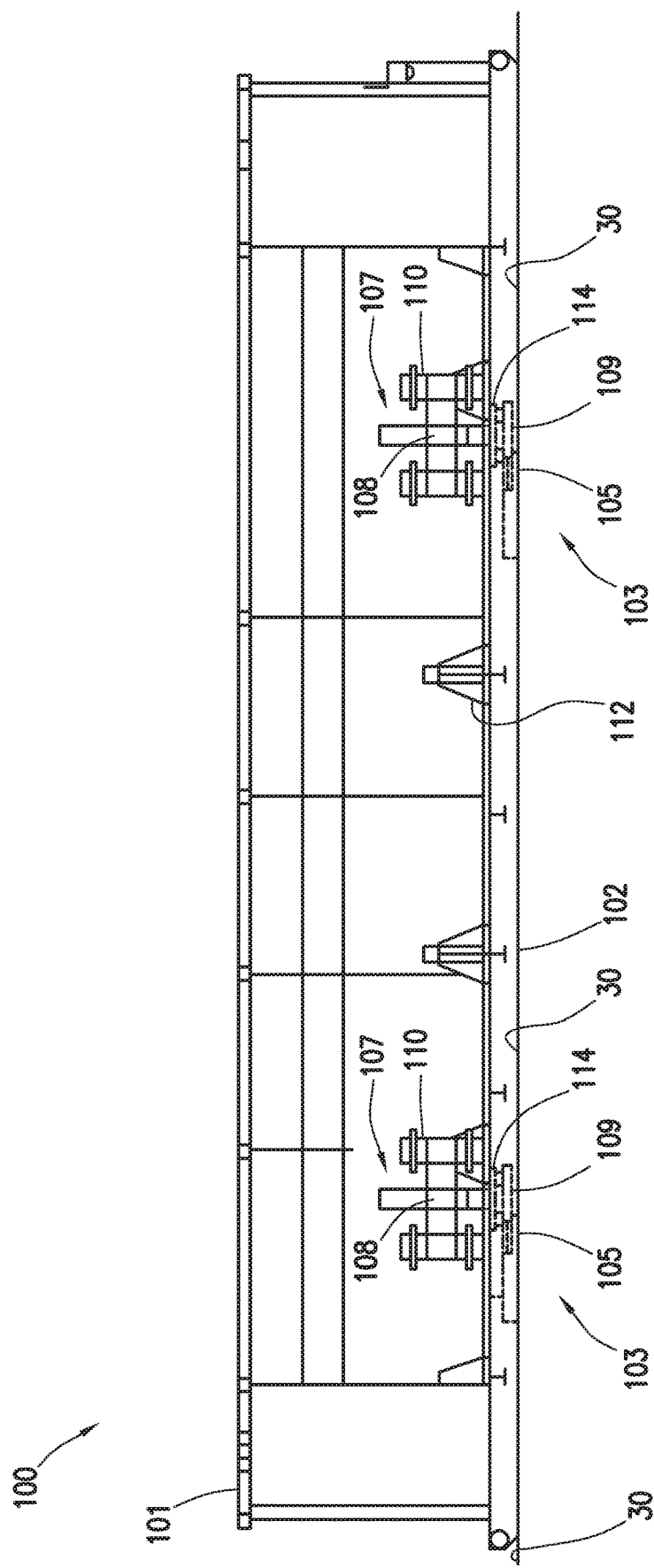

Once hydraulic walker 103 is in the extended position, sliding actuator 109 may be actuated to move walking foot 105 laterally relative to hydraulic lift assembly 107 from a first position to a second position as depicted in FIG. 4C. In some embodiments, one or more bearing surfaces, linear bearings, ball bearings, or roller bearings may be positioned between walking foot 105 and hydraulic lift assembly 107 as understood in the art to, for example and without limitation, bear the weight of walking mud tank 101 and any equipment thereon during a walking operation. Sliding actuator 109 may include one or more hydraulic cylinders or other linear actuators used to move walking foot 105 horizontally relative to walking mud tank 101. For example, when walking foot 105 is in contact with the ground as depicted in FIG. 4B, the movement of walking foot 105 by sliding actuator 109 may cause walking mud tank 101 to move along ground 30 to a position as shown in FIG. 4C. Hydraulic lift assembly 107 may retract, lifting walking foot 105 from ground 30 and allowing walking mud tank 101 to contact the ground 30 as depicted in FIG. 4D. Sliding actuator 109 may be reactuated with walking foot 105 off ground 30 to cause walking foot 105 to be returned to its original position, resetting hydraulic walkers 103 to the first position as depicted in FIG. 4A.

In some embodiments, the walking operation as previously described may be repeated until walking mud handling system 100 is positioned as desired.

In some embodiments, at least a portion of hydraulic walker 103 may be rotated relative to walking mud tank 101 to the position depicted as hydraulic walker 103' in FIG. 3. In some embodiments, walking foot 105 and sliding actuator 109 may be rotated when walking foot 105 is off ground 30. In some such embodiments, walking foot 105 and sliding actuator 109 may be rotatably coupled to hydraulic lift assembly 107 by rotary coupler 114. Rotary coupler 114 may include one or more bearing surfaces, roller bearings, or ball bearings as understood in the art to support the weight of walking mud tank 101 and any additional equipment during a walking operation. Walking foot 105 and sliding actuator 109 may be manually rotated or may be rotated using a rotary actuator such as a motor and gearbox. By rotating hydraulic walker 103', the direction of movement of sliding actuator 109 may be changed, allowing walking mud handling system 100 to be moved in a different direction. In some embodiments, walking operations in a first direction and walking operations in a second direction may be combined to allow the positioning of walking mud handling system 100 as desired.

In some embodiments, components of hydraulic walkers 103 such as hydraulic cylinders 108 of hydraulic lift assembly 107 and sliding actuators 109 may be powered by an external hydraulic high pressure unit, with hydraulic fluid supplied to the various portions of hydraulic walkers 103 as previously described through one or more manifolds and valves.

Figure 5:
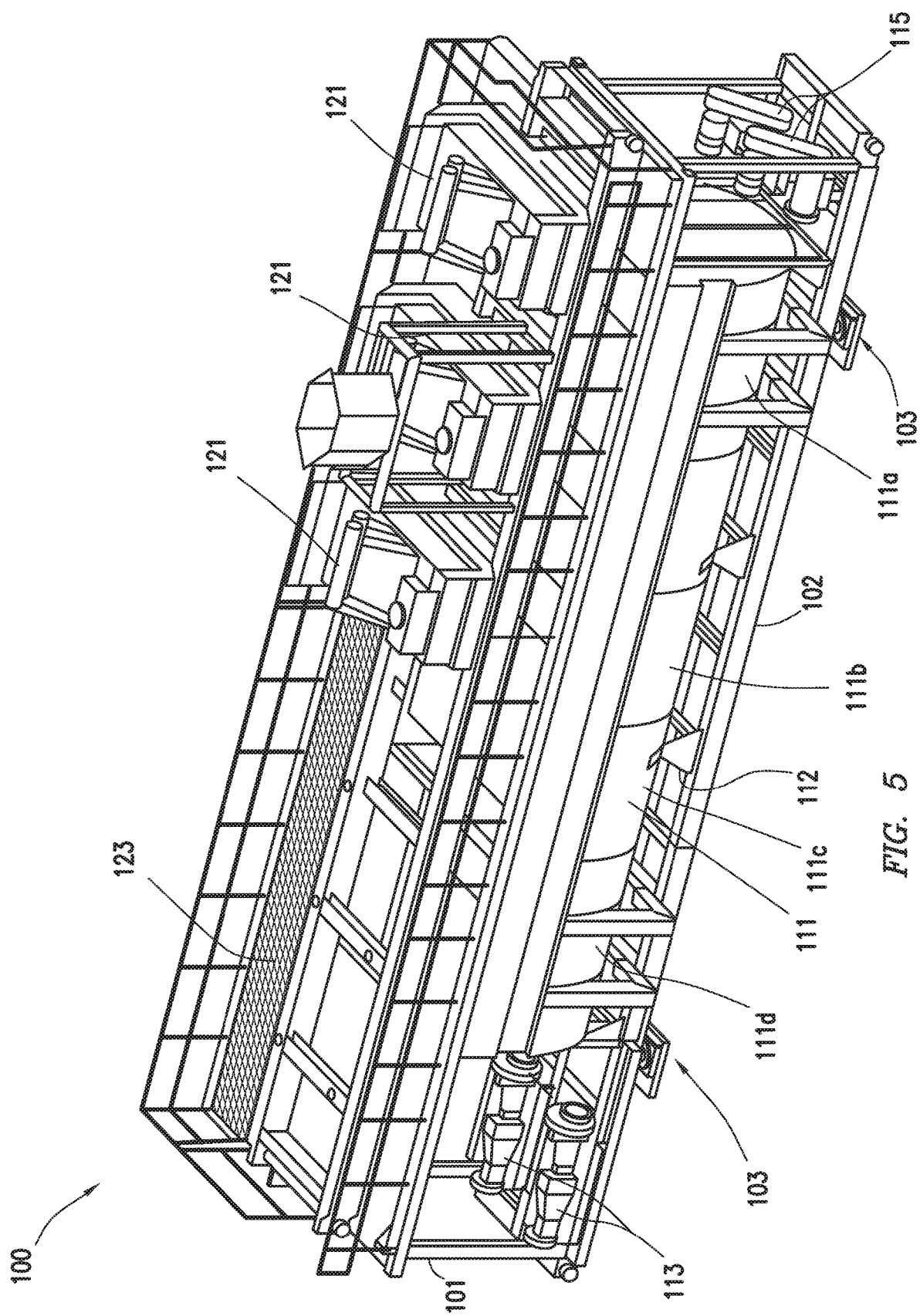
FIG. 5 is a perspective view of a walking mud handling system consistent with at least one embodiment of the present disclosure.

In some embodiments, walking mud handling system 100 may include additional mud handling equipment. For example, as depicted in FIG. 5, walking mud handling system 100 may further include mud process tank 111 that may be supported by tank supports 112 and one or more pumps such as transfer pumps 113 and trip tank pumps 115. In some embodiments, mud process tank 111 may include one or more partitions including, for example and without limitation, sand settling compartment 111a, first mud process compartment 111b, second mud process compartment 111c, and transfer compartment 111d. In some embodiments, drilling fluid positioned within mud process tank 111 may cascade from one compartment to another to, for example and without limitation, help settle out solids and help the mud processing equipment. In some embodiments, transfer pumps 113 may, for example and without limitation, be used to transfer drilling fluid from mud process tank 111 to a reserve pit. In some embodiments, hydraulic walkers 103 may be coupled to an existing mud process tank skid.

Figure 6:
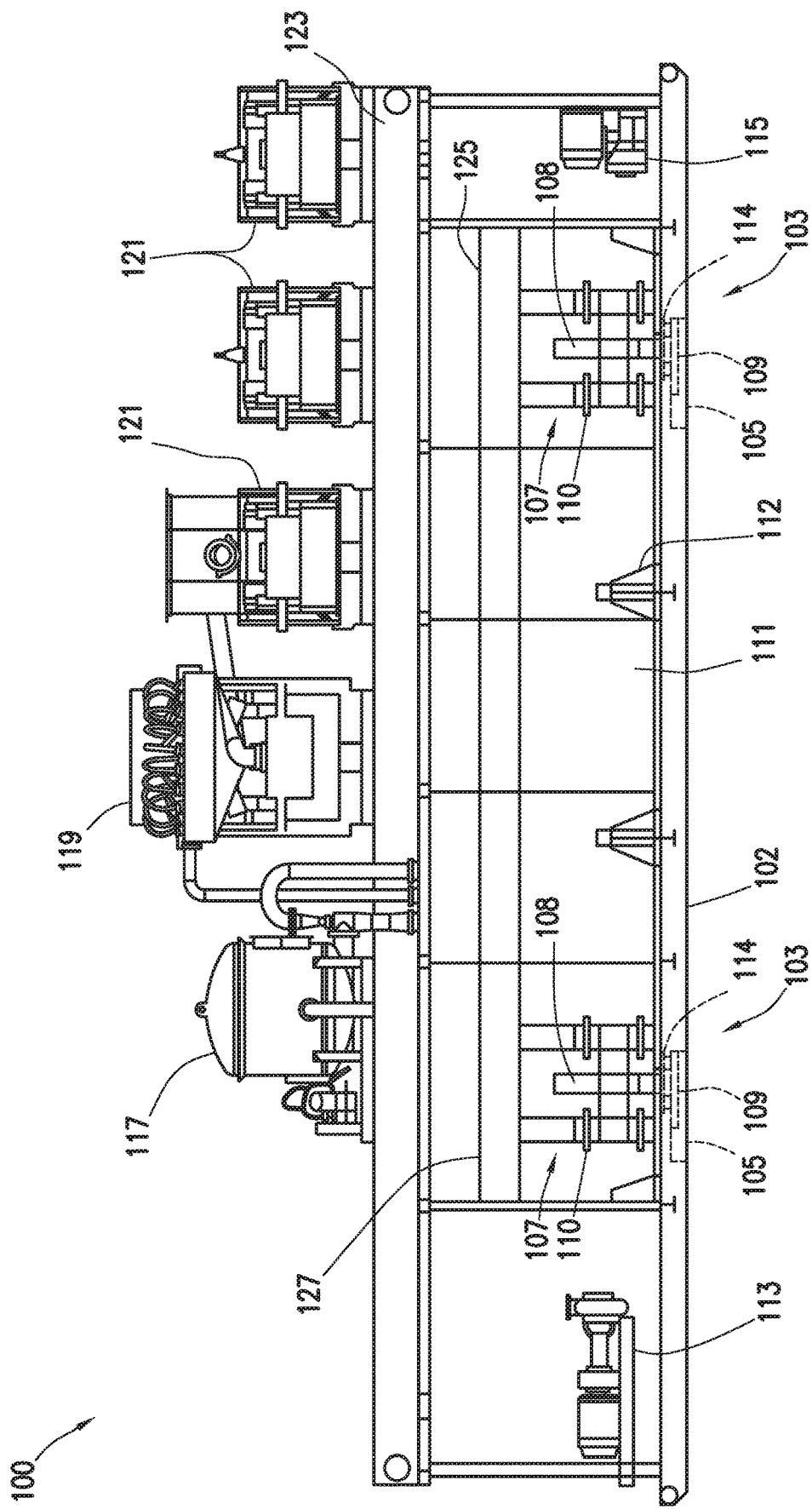
FIG. 6 is a side view of a walking mud handling system consistent with at least one embodiment of the present disclosure.

In some embodiments, as depicted in FIG. 6, walking mud handling system 100 may additionally include other mud handling or mud process equipment, such as, for example and without limitation, degasser 117, mud cleaner 119, and shaker tables 121. In some embodiments, equipment such as degasser 117, mud cleaner 119, and shaker tables 121 may be part of an existing mud handling skid 123 positionable atop walking mud tank 101. In some embodiments, mud process tank 111 may include trip tank 125 and transfer tank 129. In some embodiments, mud cleaner 119 may, for example and without limitation, include one or more of a desander or a desilter. In some embodiments, mud cleaner may be an integrated unit as depicted in FIG. 6, or may be made up of separate units such as a desander and desilter. In some embodiments, walking mud handling system 100 may include one or more of a centrifuge or vacuum degasser.

Figure 7:
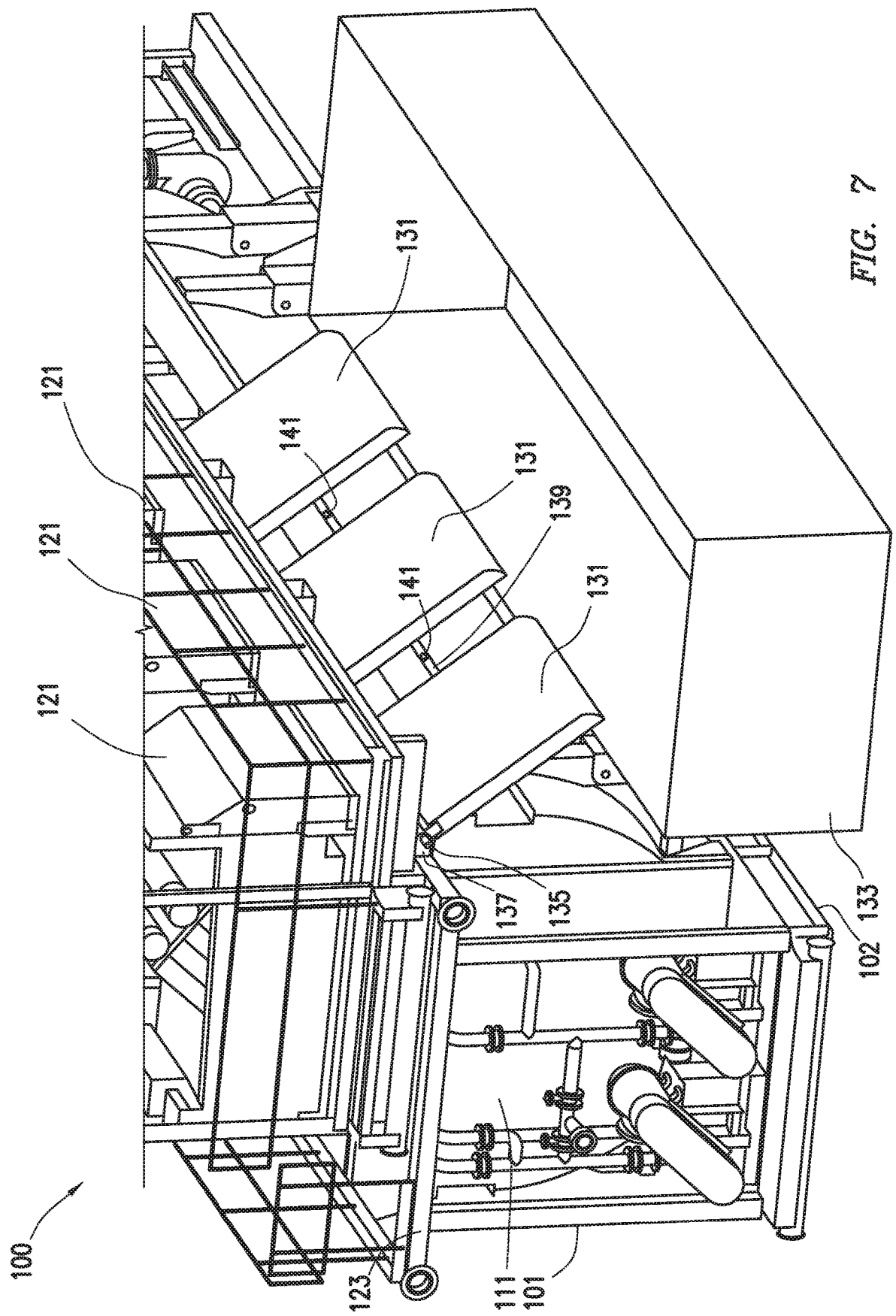
FIG. 7 is a partial perspective view of the rear of a walking mud handling system consistent with at least one embodiment of the present disclosure.

In some embodiments, as depicted in FIG. 7, cutting slides 131 are coupled to walking mud tank 101. Cutting slides 131, also referred to as shale slides, may be positioned adjacent to any shaker tables 121 to, for example and without limitation, allow cuttings removed from the drilling fluid to be moved away from walking mud handling system 100 and, for example, deposited in a receptacle such as collector 133. In some embodiments, cutting slides 131 may be pivotably coupled to walking mud tank 101 by pivot pin 135. In some embodiments, pivot pin 135 may couple to one or more pad eyes 137 coupled to walking mud tank 101 by threading pivot pin 135 through cutting slides 131 and pad eyes 137. Although described as coupled to walking mud tank 101, one having ordinary skill in the art with the benefit of this disclosure will understand that pad eyes 137 or any other comparable structure may be coupled to any part of walking mud handling system 100 capable of supporting cutting slides 131 including, for example and without limitation, mud process tank 111, mud handling skid 123, or other structures. In some embodiments, two or more cutting slides 131 may be mechanically coupled to each other by structural tie 139. Coupling cutting slides 131 may allow, for example and without limitation, for the coupled cutting slides 131 to be lifted from a retracted position suitable for transportation of walking mud handling system 100 to an extended position for use during mud handling operations as a single unit, reducing the number of lifting operations required. In some embodiments, one or more lifting points 141 may be coupled to structural tie 139 or cutting slides 131 to, for example and without limitation, allow a hoist line (not shown) to be coupled thereto during a lifting operation.

In some embodiments, hydraulic walkers 103 may be individually actuated. For example and without limitation, one or more hydraulic walkers 103 may be actuated to level walking mud handling system 100 and mud process tank 111 in the case of settling on wellsite 10.

Figure 8:
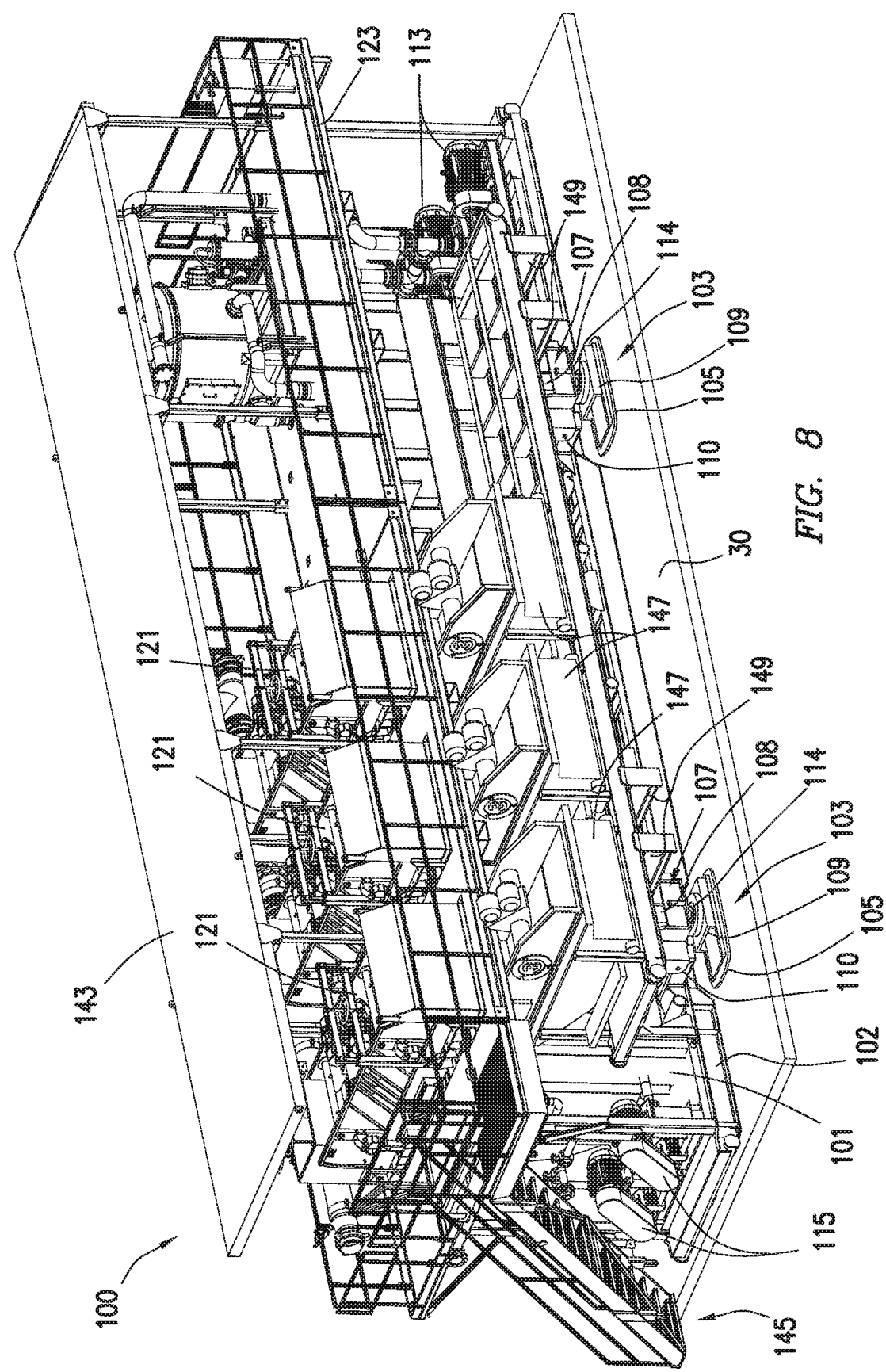
FIG. 8 is a perspective view of a walking mud handling system consistent with at least one embodiment of the present disclosure.

In some embodiments, as depicted in FIG. 8, walking mud handling system 100 may include roof 143. Roof 143 may, for example and without limitation, help protect equipment positioned on walking mud handling system 100 and personnel positioned on walking mud handling system 100 from weather, sunlight, or other worksite conditions.

In some embodiments, walking mud handling system 100 may include access stairs 145. Access stairs 145 may, for example and without limitation, allow access personnel to access mud handling equipment on mud handling skid 123 positioned atop walking mud tank 101.

In some embodiments, as depicted in FIG. 8, walking mud handling system 100 may include one or more drying shaker tables 147. Drying shaker tables 147 may be positioned adjacent to any shaker tables 121 to, for example and without limitation, further remove drilling fluid from cuttings and other debris before their deposition in collector 133 as discussed herein above. In some embodiments, drying shaker tables 147 may be mechanically coupled to walking mud tank 101 by one or more support beams 149. In some embodiments, support beams 149 may be pivotably coupled to walking mud tank 101 such that they may pivotably retract during transport operations.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A walking mud handling system comprising:
    a walking mud tank, wherein the walking mud tank is located separately from a drilling rig; and
    a plurality of hydraulic walkers coupled to the walking mud tank, the hydraulic walkers positioned in a rectangular pattern beneath the walking mud tank, the hydraulic walkers including:
    a walking foot;
    a hydraulic lift assembly including a hydraulic cylinder coupled to the walking foot; and
    a sliding actuator including one or more hydraulic cylinders coupled to the walking foot.

2. The walking mud handling system of claim 1, wherein at least a portion of the hydraulic walkers is rotatable relative to the walking mud tank.

3. The walking mud handling system of claim 1, further comprising at least one additional piece of mud handling equipment.

4. The walking mud handling system of claim 3, wherein the additional piece of mud handling equipment is one of a mud process tank, trip tank, mud transfer tank, mud process pump, trip tank pump, degasser, mud cleaner, shaker, or any other mud process equipment.

5. The walking mud handling system of claim 4, further comprising one or more cutting slides mechanically coupled to the walking mud tank positioned adjacent to one or more corresponding shaker tables.

6. The walking mud handling system of claim 1, wherein the walking mud tank comprises a mud process tank skid.

7. The walking mud handling system of claim 1, wherein the walking mud tank is adapted to receive an existing mud handling skid.

8. The walking mud handling system of claim 1, wherein the walking mud tank includes a skid.

9. The walking mud handling system of claim 1, further comprising one or more of bearing surfaces, linear bearings, ball bearings, or roller bearings positioned between the walking foot and the hydraulic lift assembly.

10. The walking mud handling system of claim 1, wherein the sliding actuator and walking foot are rotatably coupled to the hydraulic lift assembly by a rotary coupler.

11. A method comprising:
    providing a walking mud handling system, the walking mud handling system including:
    a walking mud tank, the walking mud tank located separately from a drilling rig; and a plurality of hydraulic walkers coupled to the walking mud tank, the hydraulic walkers positioned in a rectangular pattern beneath the walking mud tank, the hydraulic walkers including:
- a walking foot;
- a hydraulic lift assembly including a hydraulic cylinder coupled to the walking foot such that extension of the hydraulic cylinder extends the walking foot into contact with the ground; and
- a sliding actuator including one or more hydraulic cylinders coupled to the walking foot such that extension of the sliding actuator moves the walking foot laterally relative to the hydraulic lift;

positioning the walking mud handling system at a first position in a wellsite;
extending the hydraulic lifts of the hydraulic walkers;
lifting the walking mud tank off the ground;
actuating the sliding actuators to move the walking feet from a first position to a second position;
moving the walking mud handling system in a first direction;
retracting the hydraulic lifts;
placing the walking mud tank on the ground; and
actuating the sliding actuators to return the walking feet to the first position.

12. The method of claim 11, further comprising:
rotating the hydraulic walkers;
repeating the extending, lifting, actuating, retracting, and reactuating operations; and
moving the walking mud handling system in a second direction.

13. The method of claim 11, further comprising:
repeating the extending, lifting, actuating, retracting, and reactuating operations until the walking mud handling system is at a desired second position in the wellsite.

14. The method of claim 11, further comprising:
coupling an existing mud handling skid to the walking mud handling system.

15. The method of claim 11, further comprising:
extending a hydraulic lift of a hydraulic walker of the plurality of walkers to level the walking mud handling system.

* * * * *